United States Patent [19]
Lee et al.

[11] 3,738,475
[45] June 12, 1973

[54] CONVEYOR SYSTEM
[75] Inventors: Kirkwood M. Lee, Ogden; Arlyn G. Liddell, Bountiful, both of Utah
[73] Assignee: Eaton Corporation, Cleveland, Ohio
[22] Filed: July 16, 1971
[21] Appl. No.: 163,192

[52] U.S. Cl. ................................. 198/38, 198/78
[51] Int. Cl. .................................... B65g 43/00
[58] Field of Search ..................... 198/40, 38, 78; 214/11 A

[56] References Cited
UNITED STATES PATENTS

| | | | |
|---|---|---|---|
| 3,233,719 | 2/1966 | Engel | 198/38 X |
| 3,250,377 | 5/1966 | Minichello et al. | 198/38 |
| 3,578,143 | 5/1971 | Woodward | 198/40 |
| 3,307,162 | 2/1967 | Fink | 198/38 X |
| 3,187,878 | 6/1965 | Harrison et al. | 198/40 X |
| 2,729,214 | 1/1956 | Broekhuysen | 214/11 A |

OTHER PUBLICATIONS
RCA Technical Notes, Tn No. 802, J. Y. Avine, Nov. 15, 1968, pp. 1-5.
Controlling with Photoelectrics, Wilburn, J. E. Nov. 1965, Automation, pp. 93-103.

*Primary Examiner*—Evon C. Blunk
*Assistant Examiner*—Douglas D. Watts
*Attorney*—Lynn G. Foster

[57] ABSTRACT

A conveyor system comprising a conveyor for transporting articles from any selected one of a plurality of input devices to any selected one of a plurality of output devices having conveyor position means for indicating movement of said conveyor and logic control means for selecting the input and output devices and synchronizing discharge to and from said conveyor with the movement thereof. The system comprises conveyor position sensor having an opaque sensor wheel driven by a drive wheel of a belt or chain conveyor. The sensor wheel is formed with a plurality of concentric, annular rows of signal means, with the signal means of each row spaced apart a rotational distance corresponding to a predetermined linear distance of the conveyor belt or chain. Photoelectric and magnetic means are provided to sense passing of the signal means as the sensor wheel is rotated and the conveyor belt is moved.

3 Claims, 4 Drawing Figures

3,738,475

CONVEYOR SYSTEM

BACKGROUND

1. Field of Invention

This invention relates to article conveyors and is particularly directed to conveyor systems and means for sensing the position of an endless belt or chain conveyor and providing electrical signals indicative of such positions which may be employed for controlling operation of the conveyor or like purposes.

2. Prior Art

Endless belt or chain conveyors have long been used for transporting articles from one position to another within a factory, warehouse, assembly line, or the like. Where liquids or particulate materials are to be transported by belt or chain conveyors, receptacles for such substances are frequently secured to the conveyor belt or chain at spaced intervals therealong. These receptacles are loaded at one position of the conveyor, transported with the conveyor belt or chain, and emptied at a second position of the conveyor. Obviously, unless the receptacles are precisely positioned during the loading and emptying operations, spillage may occur which is wasteful and, depending upon the material transported, may be dangerous to persons or property in the vicinity. Moreover, this problem is aggravated when attempts are made to control operation of the conveyor by means of a computer or the like or to synchronize the movements of two conveyors, for example, to cause one conveyor to deposit an article in a particular container carried by a second conveyor. Unfortunately, no satisfactory technique has been proposed heretofore for indicating the position of a conveyor or of articles carried thereby. Attempts have been made to control conveyors on the basis of the speed of the conveyor and the time required to move between given positions. However, such attempts have been woefully inadequate or extremely expensive. Other prior art systems have employed limit-type switches which are mechanically closed by engagement with the articles carried by the conveyor. However, where high speed conveyors are employed, such systems are frequently subject to overrunning. Moreover, where computer control is employed, such switch often results in arcing, production of transients, and other sources of noise which tend to interfere with the computer operation.

BRIEF SUMMARY AND OBJECTS OF THE INVENTION

These disadvantages of the prior art are overcome with the present invention and a conveyor system is provided employing a position sensor which coordinates ingress and egress of articles to and from an article conveyor and which accurately and reliably indicates the position of articles carried by the conveyor, together with providing indications of incremental distances between such articles, and which is compatible with computer control systems and the like for synchronizing, depositing and removing of articles with selected conveyor positions.

Advantages are preferably attained by providing a sensor wheel which is rigidly coupled to and driven by one of the conveyor drive wheels. The sensor wheel is formed with concentric annular rows of signal means; the signal means of one row being spaced to correspond to the location of articles carried by the conveyor, and the signal means of the second row being spaced to correspond to incremental distances between adjacent such articles. In one form of the invention, the signal means are apertures formed in the sensor wheel and photoelectric means are positioned adjacent the sensor wheel to provide electrical signals in response to passage of light through the apertures as the conveyor is operated and the sensor wheel is rotated. In an alternative form of the invention, the signal means are magnets having "focused" fields and magnetic sensing means are positioned adjacent the sensor wheel to provide electrical signals in response to passage of the magnets. In either case, the resulting signals may, then, be supplied to a control system to precisely monitor the positions of the articles carried thereby. Moreover, these techniques avoid electromechanized switching and, hence, eliminate significant sources of noise. It is a primary object of this invention to provide an automated conveyor system for communicating articles.

It is also a significant object to provide a conveyor system wherein the ingress and egress of articles thereto and therefrom is automatically controlled in synchronization with selected positions on the conveyor.

It is also a meaningful object of the present invention to provide improved means for indicating the position of belt conveyors and articles carried thereby.

Another object of the present invention is to provide conveyor position sensing means which will sense the positon of articles carried by the conveyor, together with incremental distances between such articles.

A further object of the present invention is to provide conveyor position sensing means which will establish electrical signals indicative of the position of articles carried by the conveyor and incremental distances between such articles.

An additional object of the present invention is to provide a conveyor position sensing means which is compatible with computer control systems and the like.

A specific object of the present invention is to provide conveyor position sensing means copmprising a sensor wheel rigidly connected to and driven bY one of the drive wheels of a belt or chain conveyor, said sensor wheel being formed with a plurality of concentric annular rows of signal means with the spacing of the signal means in each of said rows corresponding to a respective distance of travel of said conveyor; and signal sensing means positioned adjacent said sensor wheel and serving to establish electrical signals in response to passage of said signal means as the conveyor is moved and said sensor wheel is rotated.

These and other objects and features of the present invention will be apparent from the following detailed description, taken with reference to the accompanying drawing.

DETAILED DESCRIPTION OF THE ILLUSTRATED EMBODIMENT

Figure 1:
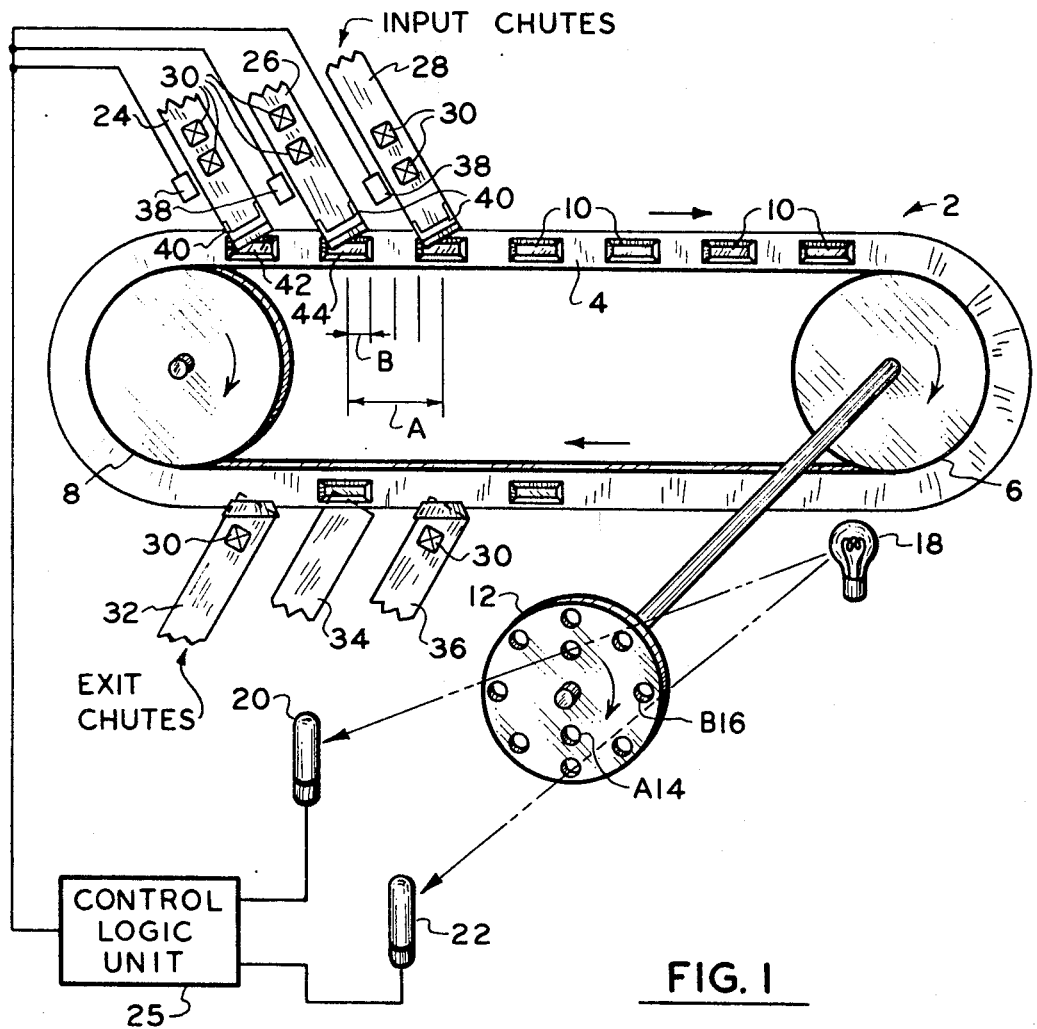
FIG. 1 is a diagrammatic representation showing a belt conveyor system embodying the position sensor of the present invention.
Figure 2:
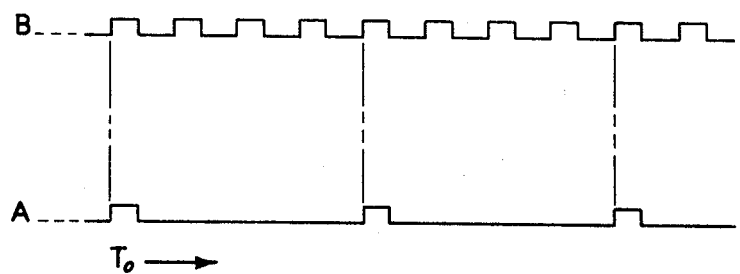
FIG. 2 is a diagrammatic representation showing the signals output by the position sensor of FIG. 1 as functions of time.

In that form of the present invention chosen for purposes of illustration, FIG. 1 shows a belt conveyor, indicated generally at 2, comprising an endless belt 4 which passes about, and is driven by, drive wheels 6 and 8. A plurality of containers 10 are carried by the conveyor 2 and are located at predetermined intervals along the belt 4. One of the conveyor drive wheels, for example, wheel 6, is also coupled to drive a sensor wheel 12. The sensor wheel 12 is composed of opaque material and is formed with a plurality of concentric annular rows of apertures, as indicated at 14 and 16, which extend completely through sensor wheel 12. The apertures of row 14 are spaced apart a rotational distance corresponding to the predetermined distance between adjacent ones of the containers 10 carried by conveyor 2, as indicated at A, while the apertures of row 16 are spaced apart a rotational distance corresponding to a predetermined increment of the distance between the containers 10, as indicated at B. A light source 18 is positioned adjacent one side of sensor wheel 12, while a pair of photoelectric cells 20 and 22 are located adjacent the opposite side of sensor wheel 12. Photocell 20 is positioned to sense light passing through the apertures of row 14 of sensor wheel 12, and photocell 22 is positioned to sense light passing through the apertures of row 16 of sensor wheel 12. The outputs from photocells 20 and 22 are supplied to the conveyor control system logic 25 for purposes which will be explained below;

In use, the containers 10 are deposited on the belt 4 of conveyor 2 at predetermined intervals, which may be controlled by the conveyor control system logic and may be synchronized thereby to coincide with emission of a pulse from photocell 20. The rate of movement of belt 4 is determined by drive wheel 6 which also serves to rotate sensor wheel 12. Since sensor wheel 12 is opaque, it will block passage of light from source 18 to the photocells 20 and 22. However, as the sensor wheel 12 is rotated, the apertures of rows 14 and 16 will be successively interposed between source 18 and the photocells 20 and 22 and will allow passage of light to the photocells 20 and 22, causing the photocells 20 and 22 to emit a series of electrical pulses. Due to the spacing of the apertures of row 14, photocell 20 will emit a series of pulses as seen by curve A in FIG. 2, each corresponding to the position of a respective one of the containers 10 carried by conveyor 2. Similarly, photocell 22 will emit a series of pulses, as seen by curve B in FIG. 2, each corresponding to a predetermined increment of the distance between adjacent ones of the containers 10. The pulses from the photocells 20 and 22 are supplied to the conveyor control system logic 25 to aid in control of the conveyor.

A plurality of input units such as conveyors or chutes are provided, as indicated at 24, 26, and 28, respectively, and each carry articles 30 to be deposited in the containers 10 of conveyor 2. In addition, a plurality of output units such as conveyors or chutes, indicated at 32, 34, and 36, respectively, are provided at a point along conveyor 2 spaced some distance from the input conveyors 24, 26, and 28. It may be desirable to send successive ones of the articles 10 from any given one of the input conveyors 24, 26 or 28 to different ones of the output conveyors 32, 34, and 36.

Figure 3:
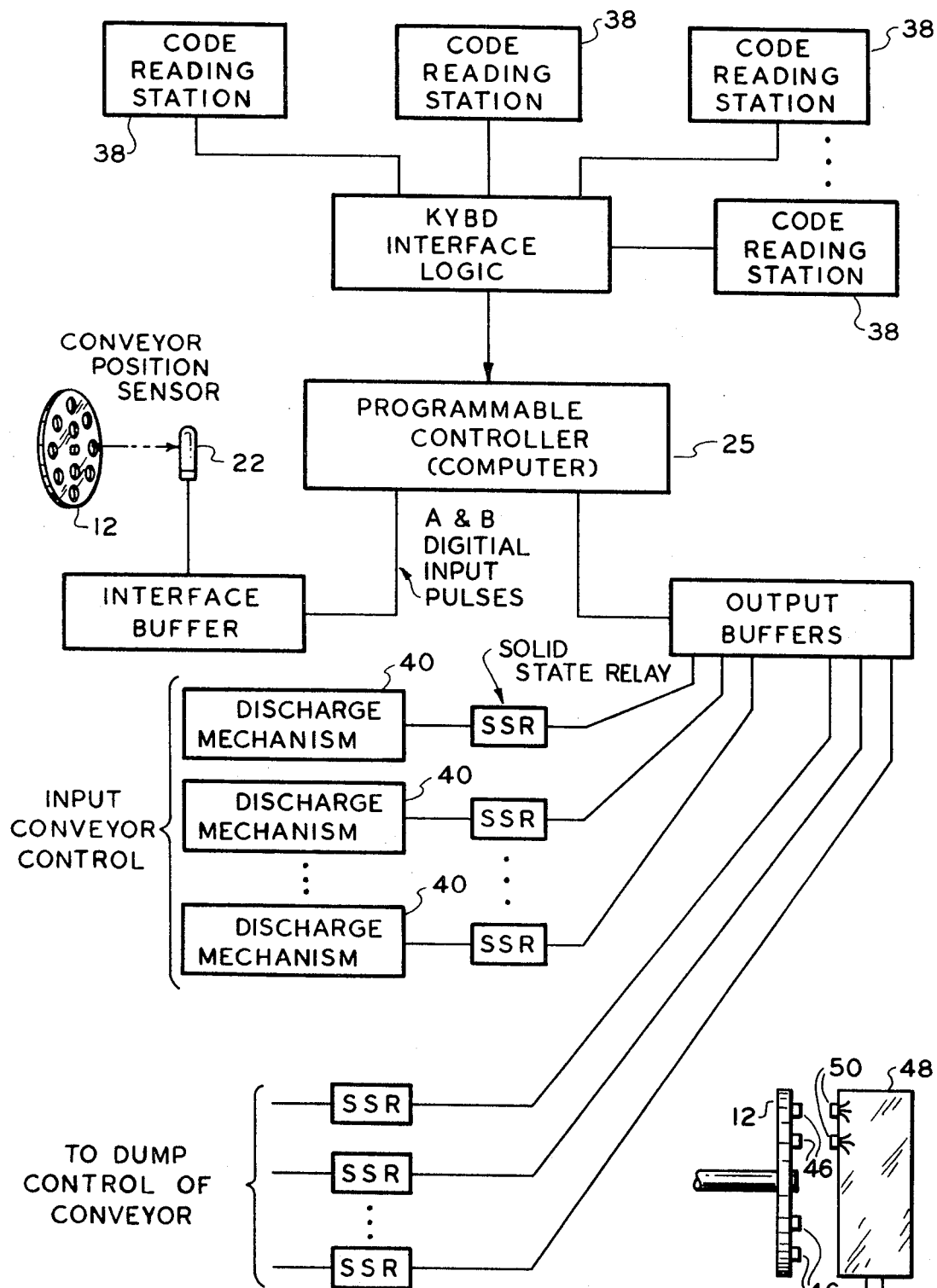
FIG. 3 is a diagrammatic representation of the control system of the conveyor system of FIG. 1.

Thus, or example, in a post office operation, a plurality of mail trucks might collect mail from mail boxes in respective areas of a city and deliver the mail in an unsorted or partially sorted condition to respective ingress chutes or conveyors 24, 26, 28. Each of the input conveyors 24, 26, and 28 has signal input means such as a code reading station 38 and a discharge mechanism 40. If desired, weigh stations or other appropriate means may also be provided. The code reading stations 38 may comprise a human operator with a keyboard or apparatus for automatically reading the code identification of each article 30 awaiting discharge from the ingress conveyor and for communicating this identification information to the control logic unit 26. Assume, by way of example, that the first of the articles 30 on input conveyors 24 and 28 are to be delivered to New York and, hence, to output conveyor 32, while the first article 30 on input conveyor 26 is to be delivered to Los Angeles and, hence, to output conveyor 36. This information is transmitted to the control logic unit 25, as best seen in FIG. 3, by the respective code reading stations 38. The control logic unit 25 then compares this information with the data from photocells 22, which indicate the positions of the containers 10 carried by conveyor 2, and triggers displacement of the ingress conveyor and actuates the discharge mechanisms 40 thereof (FIG. 1) in synchronization with the location and rate of conveyor displacement of a suitable empty one of the containers 10 of conveyor 2, such that the correct container and the article arrive at a common location at the same time. Thus, the logic unit 25 would trigger the dump mechanisms 40 of input conveyors 24 and 26 to cause the New York-bound articles 30 from input conveyor 24 to be deposited in container 42 of conveyor 2 and the Los Angeles-bound article 30 from input conveyor 26 to be deposited in container 44 of conveyor 2. The logic unit 25, then, waits until conveyor 2 has moved container 44 past input conveyor 28 and, when container 42 is moved adjacent input conveyor 28, the logic unit 25 triggers the discharge mechanism 40 of input conveyor 28 to cause its New York-bound article 30 to be deposited in container 42 along with the New York-bound article 30 from input conveyor 24. The logic unit 25 continues to track the movement of containers 42 and 44 and, when container 44 is positioned adjacent the Los Angeles output conveyor 36, the logic unit 25 actuates appropriate dump mechanism on container 44 causing the Los Angeles-bound article 30 from input conveyor 26 to be deposited on the output conveyor 36. Similarly, when container 42 is positioned adjacent the New York output conveyor 32, the logic unit 25 actuates the dump mechanism of container 42 to cause the New York-bound articles 30 from input conveyors 24 and 28 to be deposited on output conveyor 32. Obviously, numerous types of devices may be employed for transferring the articles 30 from the input conveyors 24, 26, and 28 to conveyor 2 and from conveyor 2 to the output conveyors 32, 34, and 36. However, the details of such transfer devices form no part of the present invention. Moreover, although the articles 30 have been referred to as mail articles or sacks, by way of example, the system is equally useful with other types of articles. Further, although conveyor 2 has been described as carrying containers 10, it is contemplated that the articles 30 could be placed directly on the conveyor 2 without the use of containers 10.

Figure 4:
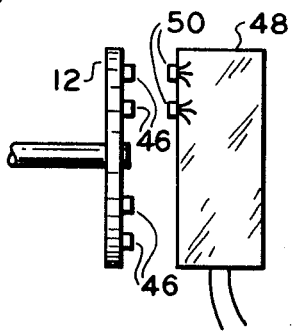
FIG. 4 is a transverse section through an alternative form of the sensor mechanism of the conveyor system of FIG. 1.

FIG. 4 illustrates an alternative form of position sensing mechanism for use with the conveyor 2. In this form of the invention, a plurality of focused field magnets 46 are provided, each mounted in a respective one of the apertures of sensor wheel 12 nd the photocells 22 are replaced by a housing 48 containing a pair of magnetic field sensing devices, such as "Magnistors," manufactured by the Hudson Company of Manchester, New Hampshire. Thus, as the sensor wheel 12 is rotated, the magnets 46 are caused to move past the magnistors 50 and produce a changing magnetic flux, which is converted into an electrical signal by the magnistors 50 and is passed to the control logic unit 25.

Obviously, numerous variations and modifications may be made without departing from the present invention. Accordingly, it should be clearly understood that the form of the present invention described above and shown in the accompanying drawing is illustrative only and is not intended to limit the scope of the present invention.

What is claimed is:

1. A conveyor system comprising:
    a plurality of article input chutes;
    a plurality of article output chutes;
    a conveyor comprising a plurality of article holding containers, each container capable of holding a plurality of articles and adapted to receive selected articles discharged from one or more of said article input chutes, each operable to discharge all of said articles therein to any selected one of said article output chutes, and drive means for driving said conveyor;
    a sensor wheel connected to be rotated by said conveyor;
    a plurality of signal means carried by said sensor wheel the signal means being spaced one from another a rotational distance about said sensor wheel corresponding to a predetermined linear distance along said conveyor;
    signal sensing means positioned to sense passage of said signal means and establishing an electrical signal in response to such passage;
    a plurality of signal input means, each located adjacent a respective one of said article input chutes, each for providing signals identifying the desired one of said article output chutes to which an article carried by the associated one of said article input chutes is to be delivered; and
    control logic means connected to receive said electrical signals from said sensing means in said signal input means for selectiVely and synchronously controlling discharge of articles from said article input chutes to selected ones of said containers and from said containers to said article output chutes.

2. A conveyor system as defined in claim 1 wherein:
    said signal input said comprises means for reading an identification code carried by sAid articles.

3. The device of claim 1 wherein;
    said signal means are disposed in a plurality of concentric annular rows, with the signal means of one of said rows being spaced a rotational distance about said sensor wheel corresponding to the linear distance along said conveyor between adjacent ones of said containers and the signal means of a second of said rows being spaced a rotational distance about said sensor wheel corresponding to a predetermined increment of the linear distance along said conveyor between adjacent ones of said containers.

* * * * *